United States Patent
Kittrell et al.

(10) Patent No.: US 6,179,971 B1
(45) Date of Patent: Jan. 30, 2001

(54) TWO STAGE PROCESS AND CATALYST FOR PHOTOCATALYTIC CONVERSION OF CONTAMINANTS

(75) Inventors: James R. Kittrell; David A. Gerrish, both of Amherst, MA (US)

(73) Assignee: KSE, Inc., Sunderland, MA (US)

( * ) Notice: Under 35 U.S.C. 154(b), the term of this patent shall be extended for 0 days.

(21) Appl. No.: 09/303,529

(22) Filed: Apr. 30, 1999

(51) Int. Cl.$^7$ .................................................. C07B 63/00
(52) U.S. Cl. .................................. 204/158.2; 204/157.4; 204/158.4
(58) Field of Search ............................ 204/157.15, 157.3, 204/158.2, 157.4, 158.21; 422/186, 186.3; 210/748; 502/2

(56) References Cited

U.S. PATENT DOCUMENTS

| | | |
|---|---|---|
| 3,781,194 | 12/1973 | Julliet et al. . |
| 3,977,952 | 8/1976 | Knoevenagel et al. . |
| 4,045,316 | 8/1977 | Legan . |
| 4,144,152 | 3/1979 | Kitchens . |
| 4,861,484 * | 8/1989 | Lichtin et al. ........................ 210/748 |
| 4,888,101 | 12/1989 | Cooper . |
| 4,892,712 | 1/1990 | Robertson et al. . |
| 4,966,665 | 10/1990 | Ibusuki et al. . |
| 4,966,759 | 10/1990 | Robertson et al. . |
| 5,032,241 | 7/1991 | Robertson et al. . |
| 5,035,078 | 7/1991 | Kipnees et al. . |
| 5,045,288 * | 9/1991 | Raupp et al. ...................... 422/186.3 |
| 5,126,111 * | 6/1992 | Al-Ekabi et al. .................. 422/186.3 |
| 5,439,652 * | 8/1995 | Sczechowski et al. ............ 422/186.3 |
| 5,779,912 * | 7/1998 | Gonzalez-Martin et al. ....... 210/748 |
| 6,037,289 * | 3/2000 | Chopin et al. ............................ 502/2 |

OTHER PUBLICATIONS

Haag W.R. & M.D. Johnson, "Direct Photolysis of Trichloroethene in Air: Effects of Co–Contaminants, Toxicity of Products, and Hydrothermal Treatment od Products", Environmental Science and Technology, 30, No. 2, 414–421 (1996). No month available.

Spaeder, T.A., "Experimental Studies of an Ethanol–Air Flow Subjected to UV Light", Air & West Management Association, 87th Annual Meeting, Cincinnati, OH (1994). No month available.

Bolton, J.R., et al., "Homogeneous Photodegradation of Pollutants in Air", Air & Waste Managemet Association, 87th Annual Meeting, Cincinnati, OH (1994). No month available.

Nimlos, M.R., et al., "Direct Mass Spectrometric Studies of the Destruction of Hazardous Wastes. 2. Gas–Phase Photocatalytic Oxidation of Trichloroethylene of TiO2: Products and Mechanisms", Environmental Science and Technology, 27, No. 4, 731–740 (1993). No month available.

Hall, R.J., et al., "Computational and Experimental Studies of UV/Titania Photocatalytic Oxidation of VOCs in Honeycomb Monoliths", Third International Conference on TiO2 Photocatalytic Purification and Treatment of Water and Air, Orlando, FL, Sep. 23–26 (1997).

Obee, T.N. and S.O. Hay, "The Augmentation of UV Photocatalytic Oxidation with Trace Quantities of Ozone," Third International Conference on TiO2 Photocatalytic Purification and Treatment of Water and Air, Orlando, FL, Sep. 23–26 (1997).

TiO2 Photocatalytic Purfication and Treatment of Water and Air, Sep. 23–26, 1997, Robert Hall et al.

Gregory B. Raupp, Photocatalytic Oxidation for Point–Of–Use VOC Abatement in the Microelectronics Fabrication Industry; Jun. 19–24 1994 pp. (2–15).

David F. Ollis; Photoreactors for Purification and Decontamination; 1993 pp. (481–494) No month available.

Suzuko Yamazaki–Nishida; Gas Phase Photocatalytic Degradation on TiO2 Pellet of Volatile Chlorinated . . .; pp. (363–378); 1994 No month available.

Hussian Al–Ekabi et al.; The Photocatalytic Destruction of Gaseous Trich–Loroethylene and Tetrachloroethylene; 1993; (719–725) No month available.

Jose Peral et al.; Heterogeneous Photocatalytic Oxidation of Gas–Phase Organics for Air Purification . . .; Feb. 20, 1992; pp. (554–565).

Gregory B. Raupp et al; Destruction of Organics in Gaseous Streams over UV–Excited Titania; Jun. 21–26 1992; pp. (2–16).

Ko–ming Wang et al.; Control of VOC Emissions From Air–Stripping Towers: Development of Gas–Phase Photocatalytic Process: 1993: pp. (733–737) No month available.

Al–Ekabi et al., "The Photocatalytic Destruction of Gaseous Trichloroethylene and Tetrachloroethylene Over Immobilized Titanium Dioxide" Photocatalytic Purification and Treatment of Water and Air, pp. 719–725, 1993 No month available.*

* cited by examiner

Primary Examiner—Kathryn Gorgos
Assistant Examiner—Thao Tran
(74) Attorney, Agent, or Firm—Bachman & LaPointe

(57) ABSTRACT

A process and apparatus for the oxidation of gaseous contaminants for the control of air pollution, comprises a two stage process comprising a photolytic stage followed by a photocatalytic stage.

39 Claims, No Drawings

TWO STAGE PROCESS AND CATALYST FOR PHOTOCATALYTIC CONVERSION OF CONTAMINANTS

BACKGROUND OF THE INVENTION

The present invention is drawn to a process and apparatus for purifying a contaminated gas stream containing contaminants by the conversion of the contaminants into less harmful products.

In spite of decades of effort, a significant need remains for an advanced technology to control stationary source emissions of volatile organic compounds (VOCs) as for example benzene, chlorinated volatile organic compounds (CVOCs) as for example trichloroethylene, and toxic air pollutants (TAPs) as for example acrylonitrile. A particular need exists for technology which controls emissions from industrial processes and other applications where low concentrations of VOCs and TAPs are present in high flow rate air streams.

Dilute air stream pollution control is becoming recognized as a major environmental control issue for the United States industrial community at large. For example, the control of indoor air pollution associated with solvent degreasing operations is necessary, including the dilute emissions associated with exhaust ventilation fans. Also, air stripping of contaminated groundwater produces dilute air emissions for which current technology provides no satisfactory solution. Catalytic combustors are available, but require processing tremendous volumes of air and result in uneconomic performance. Thermal incinerators require excessive supplemental fuel for dilute mixtures, and exhibit uncertain selectivity when CVOCs are involved. Gas membrane processes are only now emerging for gas separation, and are ill-suited for dilute mixtures. Pressure swing adsorption using zeolites or resins is not applicable to dilute mixtures, and rotating wheel adsorbers are uneconomic for such dilute concentrations of organics. Packed bed activated carbon adsorption is widely practiced, but creates a hazardous solid waste which is increasingly difficult to manage. Carbon regeneration by steam is costly, and is generally economic only for very large scale operations. Landfill options for spent carbon will become more limited, as it involves transportation and disposal of hazardous wastes, particularly for CVOC applications.

Control of indoor air pollution is also of growing importance, with the objective of enhancing workplace environmental health and safety protection. The Occupational Safety and Health Administration (OSHA) is promulgating new regulations to reduce workplace exposure to indoor air contaminants such as CVOCs. Many CVOCs are particularly toxic. Certain CVOCs are suspected carcinogens, others are linked to possible birth defects, and still others are suspected active precursors in the destruction of the stratospheric ozone layer. Of the 189 targeted air toxics in the Clean Air Act Amendments of 1990, about one-third of the compounds are chlorinated. By the standards of conventional air pollution control technology, indoor air pollution is at exceedingly dilute concentrations. An effective and economic pollution control technology in dilute air systems is the objective of this invention.

In spite of considerable efforts of researchers in the field, most UV photolytic and photocatalytic systems exhibit shortcomings in performance which limit their commercial utility for air pollution control. One shortcoming of note is the propensity of such processes to produce undesirable byproducts of incomplete oxidation, both by the photolytic treatment of contaminated air and by the photocatalytic treatment of contaminated air. Indeed, some such byproducts can be more harmful than the original contaminant being removed, such as the formation of phosgene byproduct through both photolytic and photocatalytic oxidation of trichloroethylene. As used herein, photolytic oxidative destruction is defined as the reaction of contaminants in an oxygen-containing gas stream as a result of the action of the ultraviolet radiation, by oxidation reactions, decomposition reactions, bond-scission reactions, and the like. Photocatalytic oxidative destruction is defined as the reaction of contaminants from an oxygen-containing gas stream as a result of the action of the ultraviolet radiation on the surface of a photocatalyst, by oxidation reactions, decomposition reactions, bond-scission reactions, and the like.

Photolysis could appear to be an efficient and effective means to control emissions of air-borne contaminants. It has been known for decades that contaminants in an air stream can be treated by passing the air through vessels simply containing UV lamps. Legan, in U.S. Pat. No. 4,045,316 has disclosed such a process, augmented by ozone addition. Knoevenagel and Himmelreich, in U.S. Pat. No. 3,977,952 have disclosed such a process without the augmentation by ozone. Such methods would appear to be simple and cost-effective, but they have not been used commercially. Their primary deficiency is that the methods also produce partially oxygenated byproducts, and there has been no way to control this undesirable byproduct formation. Such byproducts were recognized Kitchens, in U.S. Pat. No. 4,144,152. More recent studies have confirmed the byproduct formation with more sophisticated analytical techniques (see Haag, W. R. and M. D. Johnson, "Direct Photolysis of Trichloroethene in Air: Effect of Co-contaminants, Toxicity of Products, and Hydrothermal Treatment of Products", Environmental Science and Technology, 30, No. 2, 414–421, 1996; Spaeder, T. A., "Experimental Studies of an Ethanol-Air Flow Subjected to UV Light", Air & Waste Management Association, 87th Annual Meeting, Cincinnati, Ohio, 1994; and Bolton, J. R. et al., "Homogeneous Photodegradation of Pollutants in Air", Air & Waste Management Association, 87th Annual Meeting, Cincinnati, Ohio, 1994).

Photocatalysis using UV radiation has also been tested for decades as a means to destroy air pollutants. Juillet, et al., in U.S. Pat. No. 3,781,194 disclosed the use of titania for the oxidation of gaseous hydrocarbons, and found primarily aldehydes and ketones in the reaction products. More recently, extensive amounts of byproducts from the photocatalytic oxidation of air-borne contaminants have been found by current analytical techniques (see Nimlos, M. R., et al., "Direct Mass Spectrometric Studies of the Destruction of Hazardous Wastes, 2. Gas-Phase Photocatalytic Oxidation of Trichloroethylene of $TiO_2$: Products and Mechanisms", Environmental Sciences and Technology, 27, No. 4, 731–740, 1993; Hall, R. J., et al., "Computational and Experimental Studies of UV/Titania Photocatalytic Oxidation of VOCs in Honeycomb Monoliths:, Third International Conference on $TiO_2$ Photocatalytic Purification and Treatment of Water and Air, Orlando, Fla., Sep. 23–26, 1997; Obee, T. N. and S. O. Hay, "The Augmentation of L TV Photocatalytic Oxidation with Trace Quantities of Ozone", Third International Conference on $TiO_2$ Photocatalytic Purification and Treatment of Water and Air, Orlando, Fla., Sep. 23–26, 1997).

Naturally, it would be highly desirable to provide a process and apparatus for purifying a contaminated gas stream containing contaminants by the conversion of the contaminants into less harmful byproducts while avoiding the shortcomings associated with known processes and apparatus described above.

Surprisingly, it is found that the combination of a photolytic step with a photocatalytic step as taught the present invention, each of which produce undesirable byproducts individually, results in a more efficient process which eliminates or reduces the production of said undesirable byproducts from the combined stages. Without being bound by theory, it appears that the pretreatment of gas-phase contaminants in said photolytic stage efficiently produces partially oxygenated species which, in turn, are much more efficiently converted in the photocatalytic stage to less harmful products. Because the photolytic stage produces byproducts which are particularly easy to destroy in the photocatalytic stage, the combined two-stage process of the present invention produces little or no byproducts.

Accordingly, it is the principle object of the present invention to provide a process and apparatus for purifying a contaminated gas stream by conversion of the contaminants into less harmful products.

It is a further object of the present invention to provide a process and apparatus as mentioned above which combines photolytic and photocatalytic stages wherein the process results in a synergistic effect.

SUMMARY OF THE INVENTION

The foregoing objects and advantages are achieved by way of the present invention which provides a process and apparatus for the oxidation of gaseous contaminants in a contaminated gas stream.

The present invention comprises the oxidation of gaseous contaminants for the control of air pollution, by means of a two stage process comprising a photolytic stage followed by a photocatalytic stage. In view of the results of the prior art described above that (a) photolytic reactions produce extensive byproducts and (b) photocatlytic reactions produce extensive byproducts, it is particularly surprising that the present invention provides a process which oxidizes air pollutants without extensive production of partially oxygenated byproducts. Without being bound by theory, it is believed that the partially oxygenated byproducts from the photolytic reactor are particularly easily oxidized in the photocatalytic reactor. For example, the photolytic reactor may convert hydrocarbons to aldehydes and ketones, and these aldehydes and ketones are much more reactive in the photocatalytic stage than were the original hydrocarbon contaminants. However, that would only account for a complete photocatalytic destruction of those hydrocarbons which had already been converted to partially oxygenated species in the photolytic stage. Furthermore, not only are these partially oxygenated species converted in the photocatalytic stage, but also they appear to facilitate the oxidation of other unconverted contaminants from the photolytic stage. It appears that the presence of these partially oxygenated species entering the photocatalytic stage facilitate surface reactions on the photocatalyst, such as chain reactions, which also effect the destruction of other contaminants on the photocatalyst which are not themselves partially oxidized in the photolytic stage. Thus, a synergistic effect is obtained by the process.

Further objects and advantages of the present invention will appear from the detailed description.

DETAILED DESCRIPTION

The present invention is drawn to a process and apparatus for purifying contaminated gas streams by the conversion and oxidation of the contaminants into less harmful products.

The process of this invention comprises first passing the contaminated gas through a photolytic stage, in which the action of the UV radiation causes reactions of the contaminants, at least partially forming oxygenated species other than carbon dioxide. The photolytic stage contains no solid catalyst. It consists of a reactor vessel containing ultraviolet lamps, through which the contaminated gas passes while being exposed to the action of the ultraviolet radiation. The photolytic stage is operated such that it converts at least 10% (molar) of the entering contaminant of said contaminated gas to partially oxidized products. Excluded from this 10% yield of partially oxygenated byproducts are such fully oxidized products as carbon dioxide, water, hydrogen chloride and halogens such as chlorine or fluorine. Preferably, the photolytic stage converts at least 20% (molar) of the entering contaminants to partially oxidized species, and still more preferably the photolytic stage converts at least 40% (molar of the entering contaminants to partially oxidized species. Methods for control of photolytic stage operating conditions to accomplish these objectives include adjustment of temperature, residence time, and amount and intensity of ultraviolet radiation, as set forth herein below. If desired, alternating photolytic and photocatalytic stages can be employed in a repeating sequence, to accomplish these objectives.

In the photolytic stage of the process, the contaminated gas is exposed to ultraviolet radiation of wavelength shorter than or equal to about 400 nanometers (nm), preferably about 185 nanometers to about 375 nanometers. The photolytic stage may be operated at temperatures from about 0° F. to about 1000° F., preferably from 50° F. to about 200° F., and still more preferably from about 70° F. to about 150° F. The reactor may be operated at pressures from 0.2 atm to 10 atm, preferably 0.8 to 1.5 atm. The residence time of the gas in the photolytic stage may be between 0.01 and 300 seconds, preferably 0.1 to 50 seconds, where residence time is defined as the ratio of the volume of the photolytic stage reactor to the total volumetric flow rate of gas passing through the reactor at the temperature and pressure of the gas entering the reactor. Generally, the use of medium pressure, high intensity ultraviolet lamps will permit the operation of the process at lower residence time, whereas the use of low pressure, lower intensity ultraviolet lamps will require the operation of the process at higher residence times. Selection of the preferred conditions within these ranges will be a matter of economic optimization for any specific application, using routine experimentation and methods well known to those skilled in the art.

Additionally, the photolytic reactor operation may be augmented by the addition of ozone, hydrogen peroxide, and/or water droplets, to the reactor inlet gas or to the reactor itself. Selection of the amounts of these optional constituents is selected from the range from about 10% of the molar amount of the contaminant entering the reactor, up to about 100 times the molar amount of the entering contaminant. It should be emphasized, however, that excess amounts of these optional constituents are not harmful to the efficiency of the process, but are limited only by economic considerations for any specific application.

In the photocatalytic stage, the photocatalyst is comprised of one or more members of the following group: titanium oxide, silicon oxide, zirconium oxide, tungsten oxide, antimony oxide, zinc oxide, stannic oxide, ferric oxide, rare earth oxides, and noble metals. Preferably, the catalyst is comprised primarily of silica, titanium in an amount from about 0% to about 5%, zirconium in an amount from about 0% to about 5%, and oxygen in an amount consistent with the chemical composition of the oxides of silicon, titanium and ziroconium. Alternatively, the catalyst may be comprised principally of titania. A further alternative is to employ a catalyst comprised of silicon oxide, in an amount from about 0.1% by weight to about 70% by weight; titanium dioxide, in an amount from about 30% by weight to about 90% by weight; tungsten oxide, in an amount from 10% by weight to about 50% by weight, preferably 20 to 30%; and platinum or palladium, singly or in combination, from about 0.01% to about 10% by total weight, preferably about 0.1 to 5%.

In the photocatalytic stage of the process of this invention, the contaminated air from the photolytic stage is passed over the photocatalyst of the present invention, wherein the photocatalyst is exposed to ultraviolet radiation of wavelength shorter than about 400 nanometers (nm), preferably about 185 nanometers to 375 nanometers. The photocatalyst may be operated at temperatures from about 0° F. to about 1000° F., preferably from 50° F. to about 200° F., and still more preferably from about 70° F. to about 150° F. The reactor may be operated at pressure from about 0.2 atm to 10.0 atm, preferably about 0.8 atm to 1.5 atm. The residence time of the gas over the catalyst may be between 0.001 and 10 seconds, preferably 0.01 to 5 seconds, where residence time is defined as the ratio of the volume of the photocatalyst to the total volumetric flow rate of gas passing through the reactor at the temperature and pressure of the gas entering the reactor. The use of medium pressure, high intensity ultraviolet lamps will permit the operation of the process at lower residence time, whereas the use of low pressure, lower intensity ultraviolet lamps will require the operation of the process at higher residence times. Selection of the preferred conditions within these ranges will be a matter of economic optimization for any specific application, using routine experimentation and methods well known to those skilled in the art.

The contaminated gas may be contacted with the photocatalyst in any fashion known to those skilled in the art, preferably by passing the gas over a packed bed of the photocatalyst which is illuminated with an ultraviolet radiation. The ultraviolet radiation can be caused to illuminate the photocatalyst in any fashion known to those skilled in the art, preferably by imbedding the light bulbs in the packed bed of the photocatalyst. Alternatively, the photocatalyst may be arranged in beds of photocatalyst, with rows of light bulbs between the beds, providing alternating rows of catalyst beds and light bulbs. The wavelength of the ultraviolet radiation illuminating the photocatalyst is any wavelength customarily defined to be in the ultraviolet range, of about 10 to 400 nanometers, and preferably in the range of 150 to 400 nanometers, and more preferably 185 to 375 nanometers.

A preferred catalyst for use in the process and apparatus of the present invention is a silica-titania-zirconia catalyst comprising, from about 0.001% to about 2.0% by weight titanium, from about 0.001% to about 2% by weight zirconium, and balance essentially silicon. The catalyst may ideally include platinum and/or palladium in a total combined weight of from about 0.01% to about 10% by weight, preferably 0.1% to 5% by weight. The intensity of the ultraviolet light on the instant exterior surface of the photocatalyst in the process of the present invention is at least 0.1 mw/cm$^2$, preferably between about 5 mw/cm$^2$ to 500 mw/cm$^2$.

Optional scrubbing of products of the reaction may be performed between the photolytic and photocatalytic stages, or following the photocatalytic stage, by using water, alkaline materials, and the like.

Advantages of the present invention will be made clear from the following examples.

EXAMPLE 1

A vessel was constructed which allowed operation as a photolytic reactor. The reactor was rectangular, of dimensions 18 inches by 16 inches by 25 inches, into which were placed eight 16 watt UV lamps, producing radiation at 254 nm. Air was supplied to the reactor system by a Cincinnati Fan direct drive blower. Flow was measured by utilizing a size 4 Dwyer pilot tube flow sensor, coupled with a Magnahelic flow gauge. The main air stream from this blower was mixed with a contaminated air stream saturated with trichloroethylene (TCE), to obtain the desired contaminated air stream containing trichloroethylene (TCE), to obtain the desired reactor inlet conditions. The saturator was a jacketed glass vessel containing TCE, through which a small stream of cylinder air was bubbled. The temperature of the jacketed saturator was controlled by a Lauda Refrigerating Circulator Bath. The air to this saturator was drawn from a regulated gas cylinder, through a micro-metering control valve. By control of the saturator air flow rate and the saturator temperature, any desired concentration of contaminant could be achieved in the main air stream to the reactor.

Operating the reactor as a photolytic reactor, an inlet flow rate of TCE contaminated air entered the reactor, operating at 25° C. The entering flow rate was 249 liters/min, the inlet TCE concentration was 193 ppm, and the entering relative humidity was about 50%. Under these conditions, the residence time of the gas in the photolytic reactor was calculated from the ratio of the interior reactor volume to the entering volumetric flow rate. The residence time of the contaminated gas in the photolytic reactor was calculated to be 28.4 seconds. The overall removal of TCE was determined to exceed 98%, based on a comparison of the TCE concentrations in the gas stream entering and leaving the reactor. However, upon analysis of the reaction products by gas chromatography, several large peaks were observed on the chromatogram which were consistent with the byproducts observed by others (see above). The chromatographic peak area for the 193 ppm of TCE in the reactor inlet gas was 1,509,460 area units. The combined peak area for the dominant byproduct peaks was 359,716. Assuming the chromatographic responses for these species are similar, this is equivalent to a concentration of byproducts in the reactor effluent of 46 ppm. That is, about 24% of the inlet TCE was converted to partially oxygenated byproducts. This byproduct yield is too high to allow commercial use of photolytic reactors for control air emissions of contaminants. Indeed, the nature of the specific byproducts is such that they can be more toxic than the original air contaminants from which they are derived (see Haag, W. R. and M. D. Johnson, "Direct Photolysis of Trichloroethene in Air: Effect of Co-contaminants, Toxicity of Products, and Hydrothermal Treatment of Products", Environmental Science and Technology, 30, No. 2, 414–421, 1996).

EXAMPLE 2

The same reactor was modified to add a photocatalyst bed in the bottom section of the photolytic reactor, through which the photolytically oxidized gases passed before they left the reactor. The same 8 UV lamps were again placed in the reactor, located about 3 inches above the catalyst bed. This allowed UV radiation from the UV lamps to illuminate both the photolytic top section of the reactor, as well as providing radiation on the layer of the photocatalyst bed.

5000 cc of titania was added as a layer of photocatalyst on a supporting screen near the bottom of the reactor. This catalyst bed volume was spread over the 18 inch by 25 inch dimension of the reactor, to a depth of approximately one inch. An entering flow rate of TCE-contaminated air was established, as described above, with an inlet TCE concentration of 206 ppm. In these tests, the entering flow rate of contaminated air was 183 liters per minute, chosen so that the residence time in the photolytic portion of the reactor was similar to that disclosed above for the first experiment. In particular, since the photocatalyst section now occupied part of the total reactor volume, the volume of the photolytic stage was smaller, so the entering flow rate was proportionately reduced to maintain a constant residence time. In this second experiment, the residence time in the photolytic stage of the reactor was 30.7 seconds and the residence time in the photocatalytic stage of the reactor was 1.6 seconds. In this latter calculation of photocatalytic gas residence time, the total volume of photocatalyst charged to the reactor was divided by the volumetric flow rate of gas to the reactor. Upon measuring the performance of the reactor as described above, it was found that the overall destruction efficiency of TCE was 97%. The amount of total byproducts leaving the reactor was extremely low, at 1.5 ppm. This is surprising, because the prior art discussed above would suggest that the titania photocatalyst should form additional byproducts, not remove them (see Nimlos, M. R., et al., "Direct Mass Spectrometric Studies of the Destruction of Hazardous Wastes, 2. Gas-Phase Photocatalytic Oxidation of Trichloroethylene of $TiO_2$: Products and Mechanisms", Environmental Sciences and Technology, 27, No. 4, 731–740, 1993).

EXAMPLE 3

In a third experiment, the same reactor configuration was used, except the preferred silica-titania-zirconia catalyst was employed comprising 0.012% titania, 0.01% zirconia, balance silica. The quantity of catalyst and the reactor configuration are identical to that of Example 2. In this third experiment, the inlet concentration of TCE was 203 ppm and the inlet gas flow rate was 170 liters/min. This provided a residence time in the photolytic section of the reactor of 33 seconds, and a residence time in the photocatalyst of 1.8 seconds, both substantially the same as in Example 2. Upon analysis of the reactor effluent, the TCE destruction efficiency had risen to 98.7% and the total byproducts concentration in the effluent was non-detectable, below the point of analytical resolution. Using the analytical detection limit as the highest possible level of byproduct formation, the byproduct concentration was determined to be no higher than 0.8 ppm, and it was probably substantially lower.

Surprisingly, the examples demonstrate that the combined photolytic-photocatalytic system of the present invention permits operation of a very simple and inexpensive reactor with very high destruction efficiency and without formation of significant amounts of byproducts. It is further surprising that this can be achieved by combination of two stages which separately are well-known to form byproducts but which in combination act in synergism and do not form undesirable byproducts.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for purifying a contaminated gas stream by conversion of the contaminants into less harmful products, comprising the steps of:
   (a) providing a photolytic stage having a source of UV radiation;
   (b) providing a photocatalytic stage downstream of said photolytic stage, said photocatalytic stage having a photocatalyst and source of UV radiation;
   (c) passing said contaminated gas stream through said photolytic stage while irradiating said contaminated gas stream with UV radiation so as to convert a portion of said contaminants to partially oxidized species;
   (d) removing said gas stream with said partially oxidized species of contaminants from said photolytic stage; and
   (e) passing said gas stream with partially oxidized species of contaminants through said photocatalytic stage by passing said stream over said photocatalyst while irradiating said photocatalyst with UV radiation so as to further convert said partially oxidized species and remaining contaminants to less harmful products.

2. A process according to claim 1, further including the steps of repeating steps (c) through (e) a plurality of times.

3. A process according to claim 1, further including providing a plurality of alternating photolytic and photocatalytic stages in series.

4. A process according to claim 1, further including the step of scrubbing said gas stream with said partially oxidized species of contaminants prior to passing the gas stream to said photocatalytic stage.

5. A process according to claim 1, further including the step of passing to said photolytic stage in step (c) an amount of an additive selected from the group consisting of ozone, hydrogen peroxide, water and mixtures thereof, wherein the molar ratio amount is between about 0.10 to about 100 times the molar amount of contaminant in said gas stream.

6. A process according to claim 1, wherein the photocatalyst is present in an amount equal to the product of the residence time and the volumetric flow rate of the gas stream wherein the residence time is between about 0.001 seconds to about 20 seconds.

7. A process according to claim 1, wherein said catalyst is titania.

8. A process according to claim 1 wherein at least about 10% molar of said contaminants in said contaminated gas stream are converted to partially oxidized products, excluding fully oxided products selected from the group consisting of carbon dioxide, water, hydrogen chloride, halogen and mixtures thereof.

9. A process according to claim 1 wherein at least about 20% molar of said contaminants in said contaminated gas stream are converted to partially oxidized products, excluding fully oxided products selected from the group consisting of carbon dioxide, water, hydrogen chloride, halogen and mixtures thereof.

10. A process according to claim 1 wherein at least about 40% molar of said contaminants in said contaminated gas stream are converted to partially oxidized products, excluding fully oxided products selected from the group consisting of carbon dioxide, water, hydrogen chloride, halogen and mixtures thereof.

11. A process according to claim 1, wherein said gas stream in said photolytic stage is irradiated with ultraviolet light having a wave length of about 150 to about 400 nanometers.

12. A process according to claim 11, wherein said wavelength is between about 185 to about 375 nanometers.

13. A process according to claim 12, wherein said contaminated gas stream has a residence time in said photolytic stage of between about 0.1 to about 50 seconds, where the residence time is defined as the ratio of the volume of the photolytic stage I to the total volumetric flow rate of said contaminated gas stream.

14. A process according to claim 13, wherein the process is carried out in the photolytic stage under the following conditions: a temperature of between about 70° F. to about 150° F.; a pressure of between about 0.8 atm to about 1.5 atm.

15. A process according to claim 11, wherein said contaminated gas stream has a residence time in said photolytic stage of between about 0.01 to about 300 seconds, where the residence time is defined as the ratio of the volume of the photolytic stage I to the total volumetric flow rate of said contaminated gas stream.

16. A process according to claim 15, wherein the process is carried out in the photolytic stage under the following conditions: a temperature of between about 0° F. to about 1000° F.; a pressure of between about 0.2 atm to about 10 atm.

17. A process according to claim 15, wherein the process is carried out in the photolytic stage under the following conditions: a temperature of between about 50° F. to about 200° F.; a pressure of between about 0.2 atm to about 10 atm.

18. A process according to claim 1, wherein said catalyst comprises from about 0.1 wt. % to about 70 wt. % silicon oxide, from about 30 wt. % to about 90 wt. % titanium oxide and from about 10 wt. % to about 50 wt. % tungsten oxide.

19. A process according to claim 18, wherein said tungsten oxide is present is an amount of between about 20 wt. % to about 30 wt. %.

20. A process according to claim 19, wherein said catalyst further includes a component selected from the group consisting of platinum, palladium and mixtures thereof in an amount of between about 0.1 wt. % to about 5 wt. %.

21. A process according to claim 18, wherein said catalyst further includes a component selected from the group consisting of platinum, palladium and mixtures thereof in an amount of between about 0.01 wt. % to about 10 wt. %. oxide.

22. A process according to claim 1, wherein said photocatalyst is selected from the group consisting of oxide of titanium, silicon, zirconium, tungsten, antimony, tin, iron, rare earth and mixtures thereof.

23. A process according to claim 22, wherein said gas stream with said partially oxidized species of contaminants in said photocatalytic stage is irradiated with ultraviolet light having a wavelength of about 150 to about 400 nanometers.

24. A process according to claim 22, wherein said gas stream with said partially oxidized species of contaminants in said photocatalytic stage is irradiated with ultraviolet light having a wavelength of about 185 to 375 nanometers.

25. A process according to claim 1, wherein said photocatalyst comprises titanium in an amount of between about 0.001 wt. % to about 2.0 wt. %, zirconium in an amount of between about 0.001 wt. % to about 2.0 wt. %, silica, and oxygen in an amount sufficient to achieve the oxides of the titanium, zirconium and silica.

26. A process according to claim 22, wherein said gas stream with said partially oxidized species of contaminants has a residence time in said photocatalytic stage of between about 0.001 to about 20 seconds, where the residence time is defined as the ratio of the volume of the photocatalyst to the total volumetric flow rate of said stream.

27. A process according to claim 26, wherein the process is carried out in the photocatalytic stage under the following conditions: a temperature of between about 0° F. to about 1000° F.; a pressure of between about 0.2 atm to about 10 atm.

28. A process according to claim 26, wherein the process is carried out in the photocatalytic stage under the following conditions: a temperature of between about 50° F. to about 200° F.; a pressure of between about 0.2 atm to about 10 atm.

29. A process according to claim 22, wherein said gas stream with said partially oxidized species of contaminants has a residence time in said photocatalytic stage of between about 0.01 to about 5 seconds, where the residence time is defined as the ratio of the volume of the photocatalyst to the total volumetric flow rate of said stream.

30. A process according to claim 29, wherein the process is carried out in the photocatalytic stage under the following conditions: a temperature of between about 70° F. to about 150° F.; a pressure of between about 0.8 atm to about 1.5 atm.

31. A process for purifying a contaminated gas stream by conversion of the contaminants into less harmful products, comprising the steps of:

(a) providing a photolytic stage having a source of UV radiation;

(b) providing a photocatalytic stage downstream of said photolytic stage, said photocatalytic stage including a photocatalyst selected from the group consisting of oxides of titanium, silicon, zirconium, tungsten, antimony, tin, iron, rare earth and mixtures thereof, and a source of UV radiation;

(c) passing said contaminated gas stream through said photolytic stage under the following conditions: pressure of 0.2 to 10 atm; temperature of 0 to 1000° F., residence time of 0.01 to 300 sec, while irradiating said gas stream with ultraviolet light having a wavelength of between 185 to 400 nanometers so as to convert a portion of said contaminants to partially oxidized species;

(d) removing said gas stream with said partially oxidized species of contaminants from said photolytic stage; and (e) passing said gas stream with partially oxidized species of contaminants through said photocatalytic stage by passing said stream over said photocatalyst under the following conditions; pressure of 0.2 to 10 atm; temperature of 0 to 1000° F.; residence time of 0.001 to 10 seconds, while irradiating with ultraviolet light having a wavelength of 185 to 375 nanometers so as to further convert said partially oxidized species and remaining contaminants to less harmful products.

32. A process according to claim 31, wherein the process is carried out in the photolytic stage under the following conditions: a temperature of between about 50° F. to about 200° F.; a pressure of between about 0.2 atm to about 10 atm.

33. A process according to claim 31, wherein the process is carried out in the photocatalytic stage under the following conditions: a temperature of between about 50° F. to about 200° F.; a pressure of between about 0.2 atm to about 10 atm.

34. A process according to claim 31, wherein said photocatalyst comprises titanium in an amount of between about 0.001 wt. % to about 2.0 wt. %, zirconium in an amount of between about 0.001 wt. % to about 2.0 wt. %, silica, and oxygen in an amount sufficient to achieve the oxides of the titanium, zirconium and silica.

35. A process according to claim 34, wherein said catalyst further includes a compound selected from the group consisting of platinum, palladium and mixtures thereof in an amount of between about 0.01 wt. % to about 10 wt. %.

36. A process according to claim 34, wherein said catalyst further includes a component selected from the group consisting of platinum, palladium and mixtures thereof in an amount of between about 0.1 wt. % to about 5 wt. %.

37. A process according to claim 31, wherein said catalyst comprises from about 0.1 wt. % to about 70 wt. % silicon oxide, from about 30 wt. % to about 90 wt. % titanium oxide and from about 10 wt. % to about 50 wt. % tungsten oxide.

38. A process according to claim 37, wherein said tungsten oxide is present is an amount of between about 20 wt. % to about 30 wt. %.

39. A process according to claim 37, wherein the photocatalyst is present in an amount equal to the product of the residence time and the volume metric flow rate of the gas stream wherein the residence time is between about 0.001 seconds to about 20 seconds.

* * * * *